United States Patent
Højbjerre et al.

(10) Patent No.: US 12,520,848 B2
(45) Date of Patent: Jan. 13, 2026

(54) KNEADING OR MIXING MACHINE

(71) Applicant: VARIMIXER A/S, Brøndby (DK)

(72) Inventors: Morten Højbjerre, Brøndby (DK);
Jesper Holmegaard Olsen, Brøndby (DK)

(73) Assignee: VARIMIXER A/S, Brøndby (DK)

( * ) Notice: Subject to any disclaimer, the term of this patent is extended or adjusted under 35 U.S.C. 154(b) by 908 days.

(21) Appl. No.: 17/599,857

(22) PCT Filed: Mar. 27, 2020

(86) PCT No.: PCT/EP2020/058799
§ 371 (c)(1),
(2) Date: Sep. 29, 2021

(87) PCT Pub. No.: WO2020/201130
PCT Pub. Date: Oct. 8, 2020

(65) Prior Publication Data
US 2022/0202022 A1    Jun. 30, 2022

(30) Foreign Application Priority Data

Apr. 2, 2019  (DK) .............................. PA201970209
Apr. 2, 2019  (DK) .............................. PA201970210

(51) Int. Cl.
| | |
|---|---|
| *A21C 1/14* | (2006.01) |
| *A21C 1/02* | (2006.01) |
| *A47J 43/07* | (2006.01) |

(52) U.S. Cl.
CPC ............... *A21C 1/148* (2013.01); *A21C 1/02* (2013.01); *A47J 43/0755* (2013.01)

(58) Field of Classification Search
CPC .......... A21C 1/148; A21C 1/02; A47J 43/0755
See application file for complete search history.

(56) References Cited

U.S. PATENT DOCUMENTS 3,912,433 A * 10/1975 Ma .......................... A23P 20/20
99/450.6
4,078,451 A *  3/1978 Norton ...................... F16P 3/04
74/613

(Continued)

FOREIGN PATENT DOCUMENTS

DE          908961 C  *  4/1954
EP        0 399 878 A1    11/1990

(Continued)

OTHER PUBLICATIONS

Partial European Search Report (3 pages) dated Mar. 14, 2023.

(Continued)

*Primary Examiner* — Claire X Wang
*Assistant Examiner* — Patrick M Mccarty
(74) *Attorney, Agent, or Firm* — Crowell & Moring LLP; John C. Freeman (57) ABSTRACT

A kneading or mixing machine including a housing with opposite side walls, a motor in the housing for driving a kneading or mixing tool. A safety shield mounted to bearings for turning about an axis (A), the safety shield adapted to at least partly shield the tool when the safety shield is turned to a shielding position, the safety shield including a pair of arms. Each arm having a head at a free end thereof, a central portion of each bearing receiving the head to allow for said turning, and the central portion of each bearing communicating with an entry slit configured for insertion of the head into the central portion in a direction transverse to the axis (A).

14 Claims, 8 Drawing Sheets

(56) References Cited

U.S. PATENT DOCUMENTS

| | | | | |
|---|---|---|---|---|
| 4,629,131 | A | * | 12/1986 | Podell .................... F16P 3/10 |
| | | | | 241/37.5 |
| 5,409,315 | A | * | 4/1995 | Evans .................... B67C 11/02 |
| | | | | 4/144.2 |
| 5,533,806 | A | | 7/1996 | Veltrop et al. |
| 5,816,439 | A | * | 10/1998 | Lovell .................... B65D 25/32 |
| | | | | 220/761 |
| 6,062,725 | A | * | 5/2000 | Paturel .................... B01F 35/60 |
| | | | | 366/206 |
| 6,164,575 | A | * | 12/2000 | Karkos, Jr. ............. A47J 43/07 |
| | | | | 241/199.12 |
| 6,435,708 | B1 | * | 8/2002 | Huang .................... B01F 35/60 |
| | | | | 99/348 |
| 9,635,982 | B2 | * | 5/2017 | Zakowski ........... A47J 43/0716 |
| 10,173,187 | B2 | | 1/2019 | Højbjerre et al. |
| 2005/0241727 | A1 | * | 11/2005 | Kosmyna ................ B67C 11/02 |
| | | | | 141/297 |
| 2008/0230462 | A1 | | 9/2008 | Curtin .................... A47J 43/22 |
| | | | | 210/473 |
| 2009/0048614 | A1 | * | 2/2009 | Gudladt ........... A61B 17/12009 |
| | | | | 606/190 |
| 2012/0325227 | A1 | * | 12/2012 | Robinson ............ A61M 16/108 |
| | | | | 131/328 |
| 2014/0033406 | A1 | * | 2/2014 | Lebel .................... A42B 3/326 |
| | | | | 2/422 |
| 2014/0272024 | A1 | * | 9/2014 | Chen ........................ A21C 1/02 |
| | | | | 366/69 |
| 2014/0299693 | A1 | | 10/2014 | Zakowski |
| 2015/0129085 | A1 | * | 5/2015 | Everett .................... A47J 43/28 |
| | | | | 141/331 |
| 2015/0151261 | A1 | * | 6/2015 | Isailovic ................ F16M 11/42 |
| | | | | 366/331 |
| 2016/0101394 | A1 | | 4/2016 | Højbjerre et al. |
| 2016/0325250 | A1 | | 11/2016 | Lutz et al. |
| 2016/0331059 | A1 | * | 11/2016 | Basson .................. A42B 3/222 |
| 2017/0332832 | A1 | * | 11/2017 | Prefontaine ........... A47J 31/542 |
| 2018/0169600 | A1 | | 6/2018 | Lutz et al. |

FOREIGN PATENT DOCUMENTS

| | | | |
|---|---|---|---|
| EP | 3 090 669 A1 | | 11/2016 |
| KR | 20050015512 A | * | 2/2005 |
| WO | WO 2014/198584 A1 | | 12/2014 |
| WO | WO 2016/083449 A1 | | 6/2016 |

OTHER PUBLICATIONS

International Search Report dated Aug. 17, 2020 (5 pages) from PCT Priority Application PCT/EP2020/058799.

Written Opinion of the International Searching Authority dated Aug. 17, 2020 (9 pages) from PCT Priority Application PCT/EP2020/058799.

International Preliminary Report on Patentability (10 pages) dated Sep. 28, 2021 from PCT Priority Application PCT/EP2020/058799.

* cited by examiner

KNEADING OR MIXING MACHINE

This application is a national application out of Patent Cooperation Treaty Patent Application No. PCT/EP2020/058799, filed on Mar. 27, 2020, the entire contents of which are incorporated herein by reference.

This application claims under 35 U.S.C. § 119 (a) the benefit of: 1) the filing date of Denmark Patent Application No. PA201970210, filed on Apr. 2, 2019, and 2) the filing date of Denmark Patent Application No. PA201970209, filed on Apr. 2, 2019, the entire contents of each of which are incorporated herein by reference.

BACKGROUND OF THE INVENTION

Field of the Invention

A kneading or mixing machine including a housing with opposite side walls, a motor in the housing for driving a kneading or mixing tool, a safety shield mounted to bearings, for turning about an axis, the safety shield being adapted to at least partly shield the tool when the safety shield is turned to a shielding position, and the safety shield including a pair of arms. Such a machine is known in the art by the trade name Varimixer AR100™.

It is an object of the invention to improve even further the safety for operators using machines of the aforementioned type, and/or to allow for easy removal of the safety shield for cleaning thereof.

SUMMARY

In view of this object, a machine of the mentioned type is provided where each arm has an enlarged head at a free end thereof, a central portion of each bearing receiving the head to allow for the aforementioned turning, and where the central portion of each bearing communicates with an entry slit configured for insertion of the head into the central portion of the bearing, in a direction transverse to the turning axis. In one embodiment, a safety switch is located at one of the side walls and is operable between a passive state in which the motor is allowed to operate and an activated state in which the motor is prevented from operation, the safety switch being configured to switch from its passive state to its activated state when the safety shield is away from the shielding position.

According to another aspect, a machine of type mentioned in the introduction is provided, including a magnetically activatable safety switch operable between a first state in which the motor is allowed to operate and a second state in which the motor is prevented from operation, the safety switch being arranged to switch from its first state to its second state when the safety shield is away from the shielding position, such as when the safety shield has been removed from the machine housing or turned away from the shielding position, a magnet being mounted to one of the arms to give rise to the magnetic activation of the safety switch, the safety switch mounted at a position coincident with the arm when the safety shield is in the shielding position.

Further objects and technical effects resulting from the invention will be apparent from the following detailed description.

DETAILED DESCRIPTION

The invention will now be explained in more details, by reference to an embodinvent.

Figure 1A:
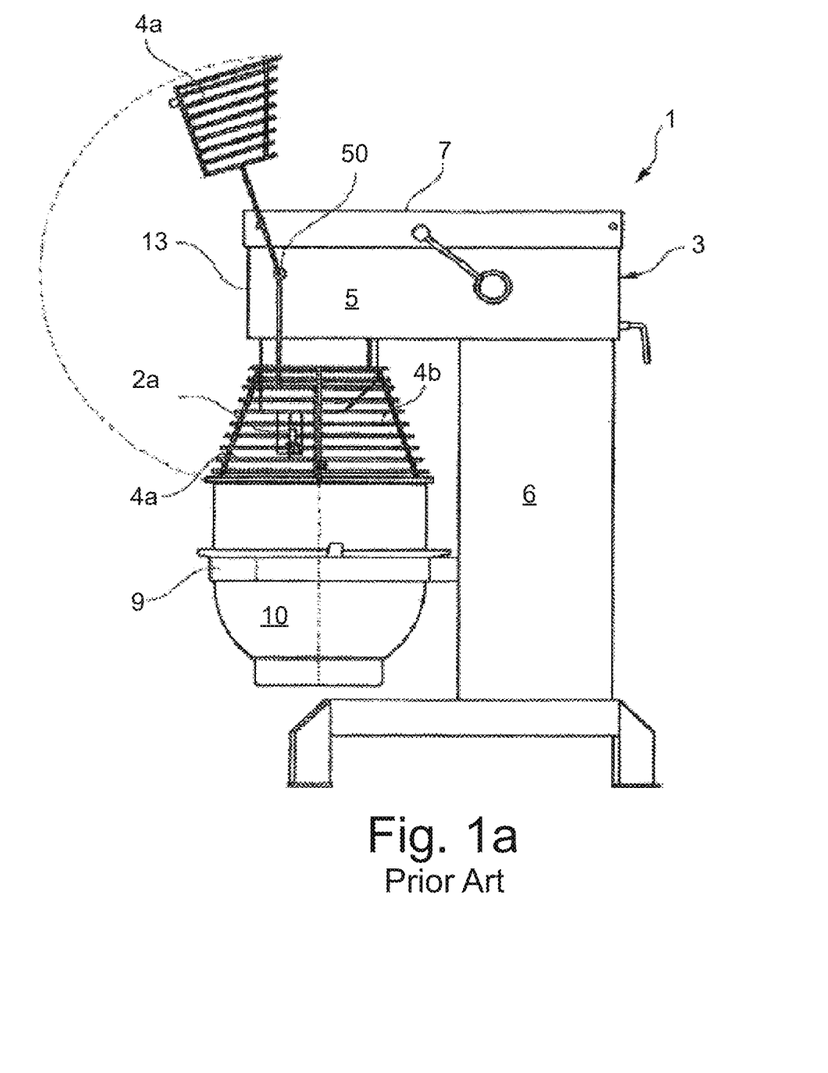
FIG. 1a is a side view showing a prior art mixing/kneading machine.

FIG. 1a illustrates a prior art kneading and mixing machine 1 known as the Varimixer AR100™, adapted to carry a not shown kneading or mixing tool via a rotating holder 2a which is driven by a motor arranged in a housing 3 of the machine 1.

The housing 3 includes a vertically extending column 6 and a front part 7 that has opposite side walls 5 and that is mounted on top of the column 6 to extend forward towards a machine operator (not shown) standing in front of the machine 1. The front face of the front part 7 is provided with a control panel 13 for user operation of the machine 1, and the column 6 has horizontally extending arms 9 adapted to carry a bowl 10. The arms 9 are preferably height adjustably mounted to the column 6 in order to facilitate mounting and demounting of a kneading/mixing tool extending down from the holder 2a into the bowl 10, and to facilitate removal and placement of the bowl 10 from the machine 1, by lowering the bowl 10.

The kneading and mixing machine 1 furthermore includes a safety shield front part 4a, shown in FIG. 1a in two alternative positions, that may be turned to the shown raised position and that is adapted to at least partly shield the operator from the tool when the safety shield front part 4a is turned down to the shown shielding position in which the safety shield front part 4a rests against a safety shield rear part 4b. The safety shield front part 4a defines in the turned down position together with the safety shield rear part 4b a frusto-conical enclosure in which, when the motor runs, the rotating holder 2a moves for the tool to process material, such a dough, contained in the shown bowl 10.

The prior art safety shield front part 4a may as shown be a metal grid structure with two metal arms 16. Alternatively, a prior art safety shield front part 4a may as shown in FIG. 1b be a molded transparent plastic material structure having mounted thereto the aforementioned opposite metal arms 16 and with an over-all contour similar to that of the metal grid structure 4a of FIG. 1a; the plastic material safety shield front part 4a may as shown in FIG. 1b include an integrally molded funnel-shaped portion 20 for introducing, via an opening O, a fluid or other substance into the bowl 10 during the mixing/kneading, when the safety shield front part 4a is in the turned down position.

In the shown prior art machine 1 each metal arm 16 is for practical purposes permanently connected with the housing 3 at a bearing 50 on a respective one of the two side walls 5.

Figure 2A:
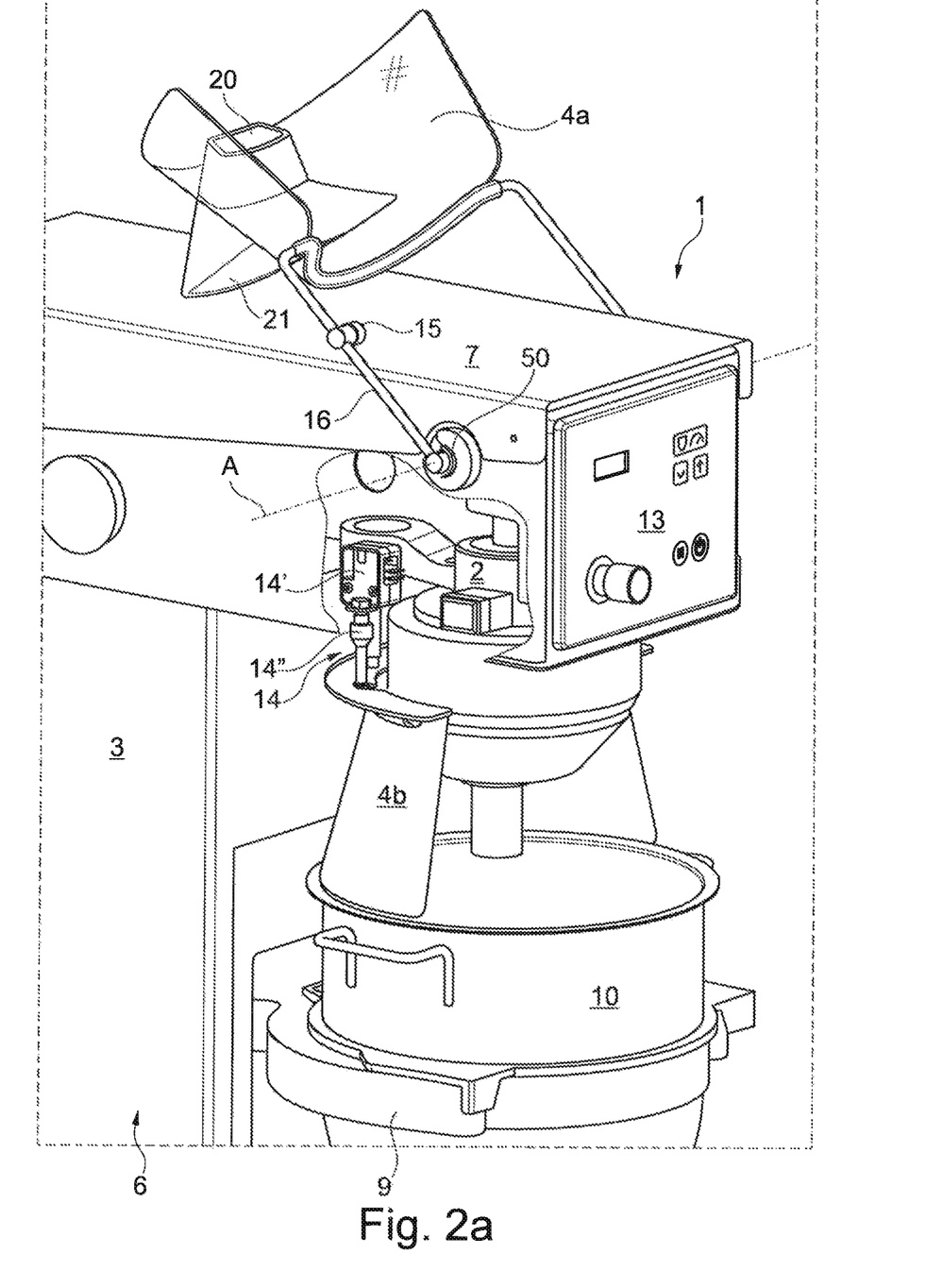
FIG. 2a is a partial perspective view of a mixing/kneading machine of with the safety shield of the invention.

FIG. 2a shows a partial, perspective view of an embodiment of a machine 1 of the present invention, useful for processing food products by the mixing/kneading. Features of the present invention common with the prior art machine are illustrated in the figures using the same reference numerals.

Figure 1B:
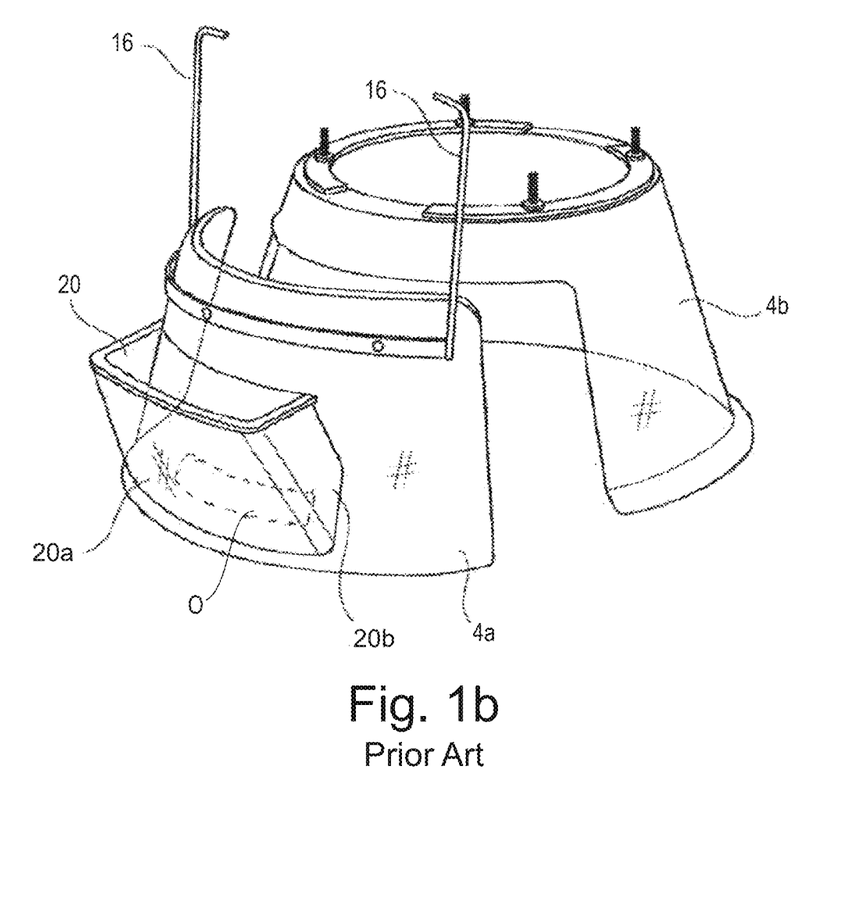
FIG. 1b is a perspective view of a prior art plastic material safety shield front part.

As in the prior art, the safety shield front part 4a of the kneading and mixing machine 1 of the present invention is pivotally connected with the housing 3 at opposite bearings 50, and may be a metal grid structure or, as shown in FIG. 2a, a molded transparent plastic material structure having mounted thereto the aforementioned opposite metal arms 16 and with the aforementioned integral funnel-shaped portion 20 which is similar to that shown in FIG. 1b.

The housing front part 7 includes as shown in FIG. 2a the motor 2, and optionally a first magnetically activatable safety arrangement 14 including a safety switch 14' being operable between a passive state in which the motor 2 is allowed to run and an activated state in which the motor 2 is prevented from running in that the safety switch 14' interrupts the current to the motor 2. The safety switch 14' is arranged to switch from its passive state to its activated state if and when the safety shield rear part 4b is moved away from its shielding position shown in FIG. 2a, by a magnet 14" mounted to the safety shield rear part 4b. The safety switch 14' may be as disclosed in WO2014/198584 or WO2016/083449, and the shield rear part 4b may be mounted to the machine 1 in a manner known per se, using pins received by key-slots.

In FIG. 2a the shield front part 4a is illustrated in its raised position resting in contact, in this case via the funnel-shaped portion 20, against the top of the front part 7. The shield front part 4a is mounted for turning about the shown axis A.

Figure 2B:
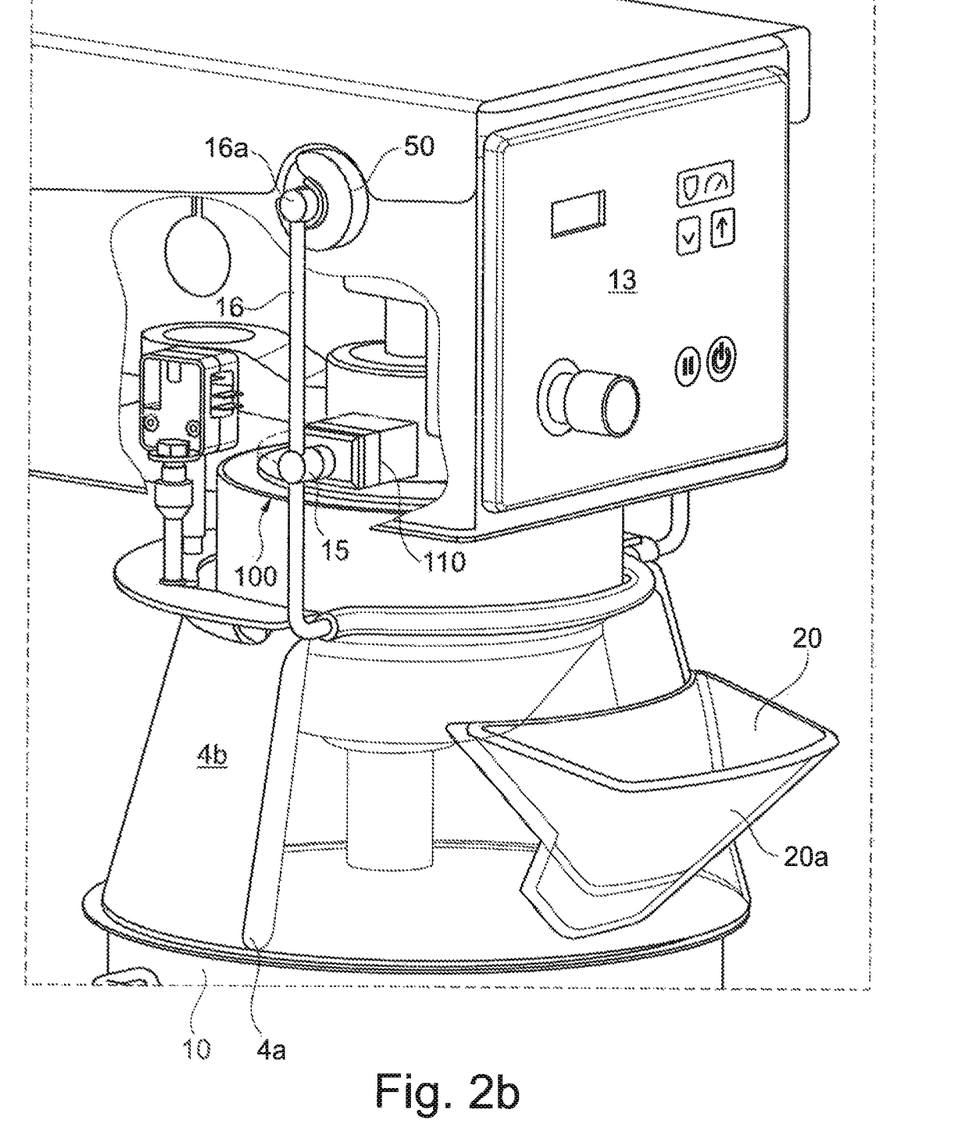
FIG. 2b is a view similar to that of FIG. 2a, with the safety shield in a turned down position for operation of the machine.

Referring to FIG. 2b, which shows the preferred plastic material shield front part 4a in the turned down position, the integrally molded funnel-shaped portion 20 is defined in part by a wall 20a that surrounds an opening O (not shown) in the plastic material structure and that extends upwards and outwards towards the operator and inwards away from the operator, from the face of the plastic material structure, to define an elongated and relatively wide filling mouth and a relatively narrow discharge mouth, from which discharge mouth fluid or other substance falls into the bowl 10.

Figure 2C:
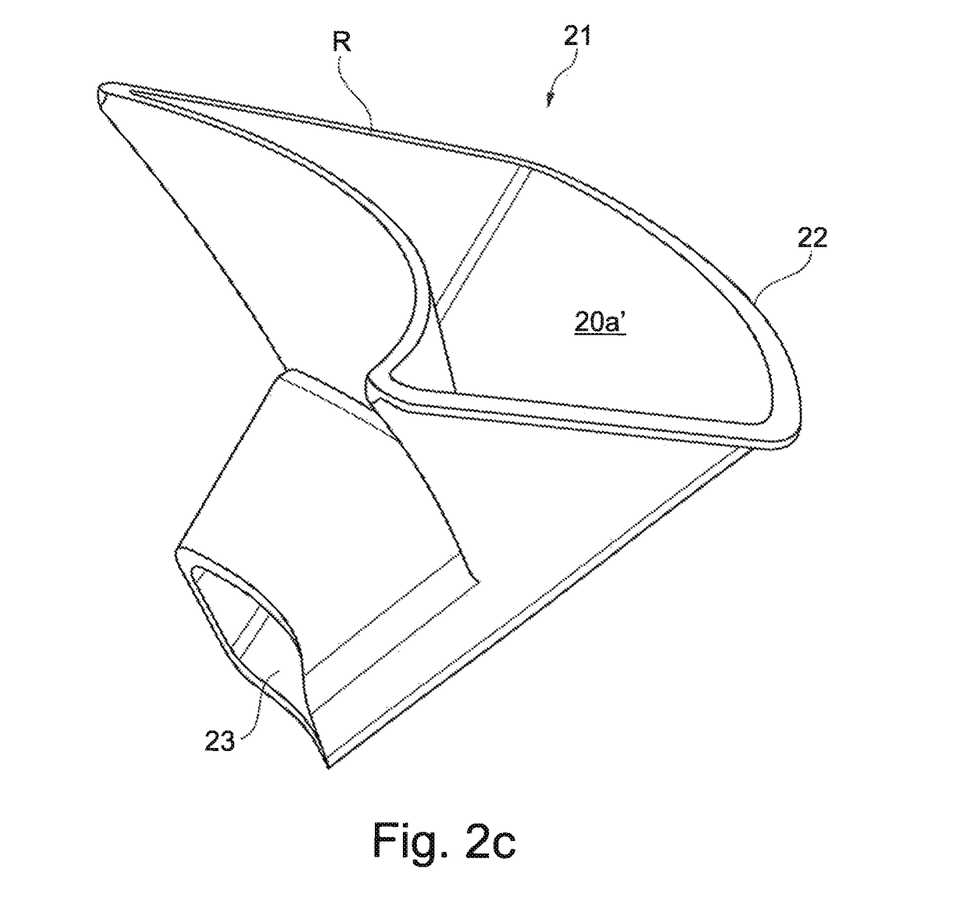
FIG. 2c is a perspective view showing a removable covering element for a funnel-shaped portion of the safety shield shown in FIG. 1b, and FIGS. 3a-3c are perspectives view showing a bearing for a safety shield, in front and rear views, FIG. 3b showing the bearing receiving an arm of the safety shield.

In the shown embodiment, the shield front part 4a has an optional, removable covering element 21 of the present invention, shown in FIG. 2c, which element 21 has a shape corresponding to that of the funnel shaped portion 20 and which is made of an elastomeric and flexible material, preferably a rubber-like material such as silicone rubber, which is food compatible and which allows for filling of substances into the bowl 10 when the shield front part 4a is in its lowered position shown in FIG. 2b. Preferably the material of the element 21 is capable of withstanding temperatures of at least 50° C., which may the temperature of the substances introduced into the bowl 10 via the funnel shaped portion 20. The removable covering element 21 preferably is formed as a sleeve which is open at both ends and which may be turned inside out, to allow for easy cleaning of the surfaces thereof exposed to the aforementioned substances. The covering element 21 preferably has heat insulating properties to protect the funnel shaped portions against any damage that would result from direct contact with the aforementioned hot substances.

The element 21 preferably has a wall 20a' with a peripheral rim R that may have a groove receiving edges of the molded wall 20a, and is configured to be positioned inside and against the funnel-shaped portion 20, to cover and protect the plastic material faces thereof that would otherwise be exposed to the substances introduced into the bowl 10 via the funnel-shaped portion 20.

As will be understood the element 21 defines i.a. the faces of the aforementioned elongated and relatively wide filling mouth 22 and of the discharge mouth 23, from which discharge mouth fluid or other substance enters the bowl 10. Since such fluid/substance may be hot and sticky, frequent cleaning/rinsing of such fluid contact surfaces is required, and this may be done by simply snapping off the element 21, which fits in a washer better than the entire shield front part 4a. Convenient materials for the plastic material shield front part 4a and the element 21 may be polycarbonate and silicone, respectively.

In FIG. 2a the shield front part 4a rests against the top of the front part 7 with the element 21 being in contact with the top surface of the front part 7, allowing the rubber-like material of the element 21 to protect the plastic material of the shield front part 4a against damage resulting from the shield front part 4a being turned hard against the front part 7.

Figure 3A:
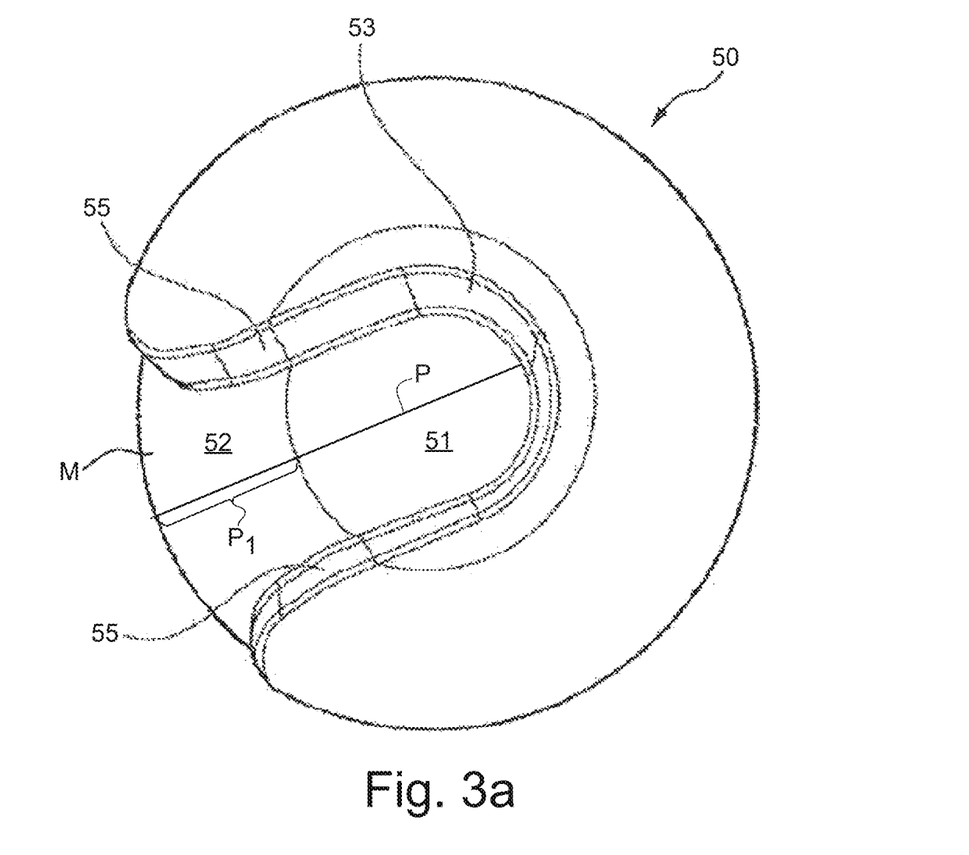
Figure 3B:
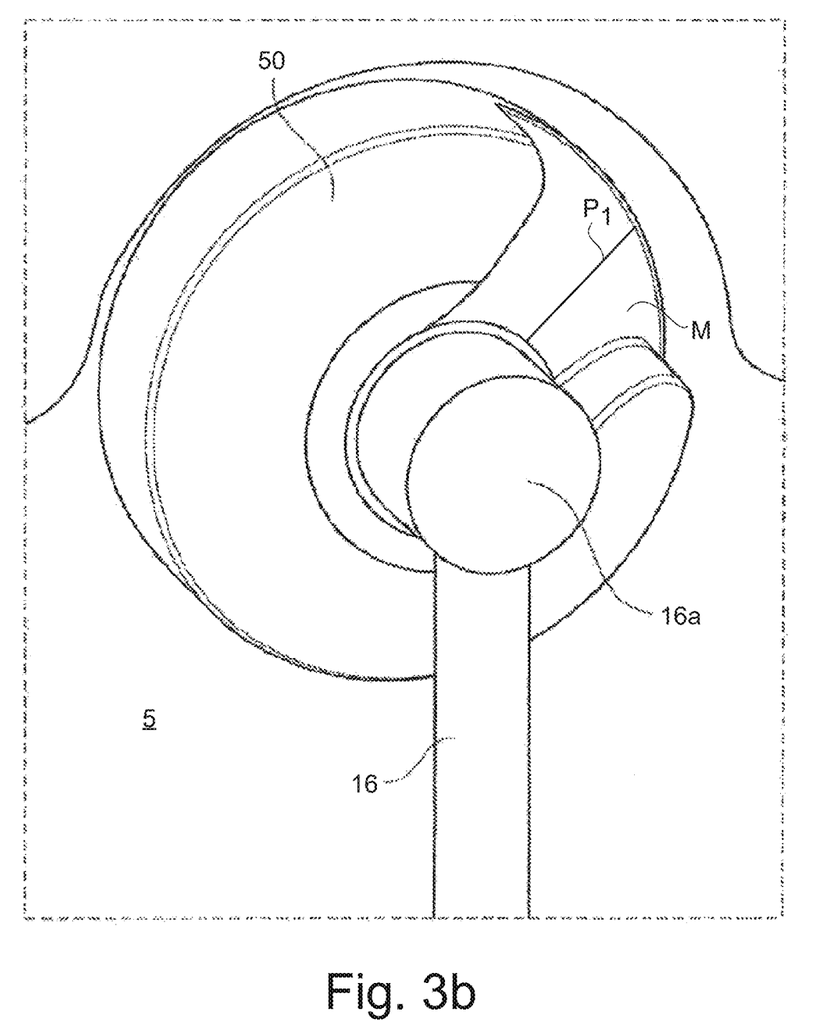

FIG. 2b is an enlarged partial perspective view showing two parts 15, 110 of a second safety mechanism 100 and a bearing 50 of the present invention, the bearing 50 without and with a shield front part 4a arm 16 mounted thereto being shown in FIGS. 3a and 3b, respectively. The bearings 50 cooperate with a cylindrical head 16a mounted onto each arm 16.

Figure 3C:
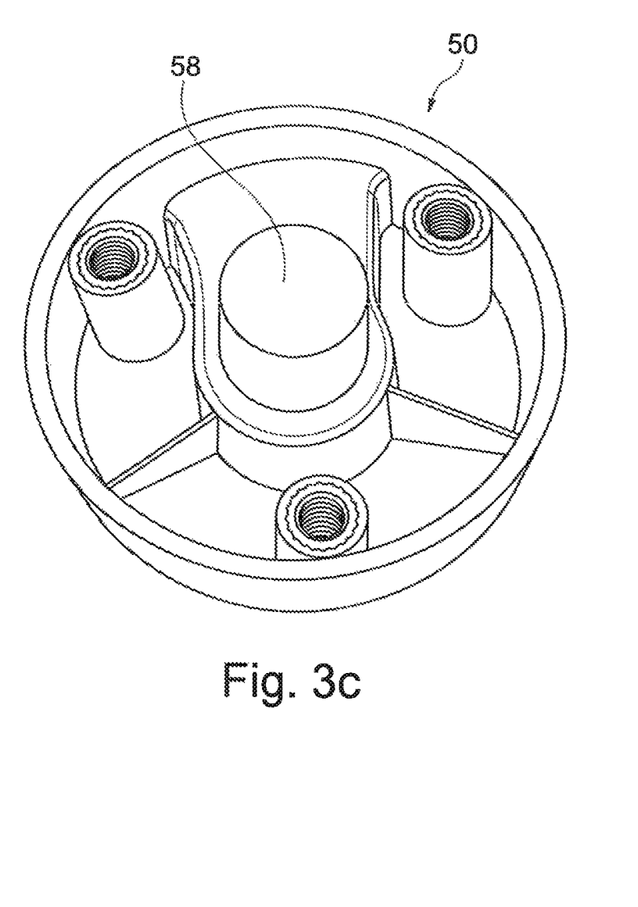

Each bearing 50 of the invention, shown in front and rear perspective views in FIGS. 3a and 3c, has an entry-slit 52 for laterally receiving in a direction perpendicular to the axis A the head 16a and are formed as a main body with a central portion or recess 51 delimited by a cylindrical wall 53 that opens up to define together with two opposite converging walls 55 the entry-slit 52. As shown in FIG. 2a the bearings 50 may be mounted onto the side walls 5 such that the mouth M of the entry-slit 52 is oriented away from the front face of the front part 7. As shown in FIG. 3a, the entry-slit 52 and the central portion or recess 51 define a path P from the mouth M to the wall 53. Such path is followed by the head 16a when it is inserted into the central portion or recess 51. Note that the line in FIG. 3a denoting path P is illustrative only and does not limit the path upon which head 16a follows from the mouth M to the recess 51.

To facilitate a controlled locking in place of the heads 16a of the two arms 16 in the respective bearing 50, the heads 16a and/or the two opposite walls 55 are preferably provided with a resilient material surface layer that is slightly compressed as the head 16a moves along the path P and the two converging walls 55 until reaching the recess 51 as shown in FIGS. 3a and 3b. Controlled locking means that when the heads 16a reach the recess 51, the heads 16a and their corresponding arms 16 are able to rotate around axis A, but are unable to translationally move along partial path $P_1$ of path P (see FIG. 3b) out of the entry slit 52 and the mouth M. The heads 16a are unable to translationally move due to the walls 55 pressing on the heads 16a. As shown in FIG. 3b, when the head 16a is controllably locked at the recess 51, the head 16a is unimpeded along the partial path $P_1$ that forma a portion of the path P that extends from the head 16a to the mouth M of the entry slit 52. Note that the line segment in FIGS. 3a and 3b denoting partial path $P_1$ is illustrative only and does not limit the path upon which head 16a follows from the mouth M to the recess 51. Removal of the entire shield front part 4a from the bearing 50 is done by the operator turning the shield front part 4a into a position where the elongated arms 16 are generally aligned with the entry slit 52 and then applying a force onto the shield front part 41. Such removal is desirable at certain intervals for cleaning the entire shield front part 4a.

Seen best in FIG. 3c is also an optional magnet or a magnetizable body 58 mounted to the bearing 50 and cooperating with an optional magnetizable body or magnet included in the cylindrical head 16a of each arm 16. The action of the magnet serves on the one hand to provide some magnetic force resistance against inadvertent removal of the head 16a and, hence, the shield front part 4a from the machine 1, and also to guide the head 16a into the entry slit 52 when mounting the shield front part 4a after cleaning thereof.

The second safety mechanism 100 referred to above includes, as shown in FIG. 2b, a first magnetic part 15 fixed to one of the arms 16 at a predetermined position along its length, as well as a magnetically activatable safety switch 110 mounted inside the front part 7 at a position along a line coincident with the extension of the arm 16 when the shield front part 4a is in the turned down position shielding the operator, as shown in FIG. 2b. The magnetically activatable switch may preferably be of the type disclosed in WO2016/083449, and is generally configured to interrupt electrical current to the motor 2 when the shield front part 4a is turned away from its shielding position shown in FIG. 2b, i.e. when the magnetic body 15 is no longer in a position aligned with the switch 110 on the outside of the side wall 5, as may be the case either when the shield front part 4a is turned to a raised position as shown in FIG. 2a or where it has been removed by release of the head 16a from the bearing 50. It may be understood that for added safety a second safety mechanism 100 as discussed above may be used for each of the two arms 16. Where the safety mechanism 100 is as disclosed in WO2016/083449 the aforementioned magnetic body 15 mounted onto the arm 16 may correspond to that designated numeral "8" shown in FIGS. 1A through 2B in WO2016/083449.

An invention also disclosed herein relates to an improved safety shield of the type adapted to at least partly shield an operator of a mixing/kneading machine 1 from a mixing/kneading tool when the safety shield 4a is in a shielding position with the tool working in a bowl 10, the safety shield 4a being a molded, preferably transparent, plastic material structure including an opening O for introducing a substance into the bowl 10 during the mixing/kneading; the kneading and mixing machine may be with or without the specific type of arms discussed above.

Known is a kneading and mixing machine with such a safety shield that may be turned to a position at least partly shielding the operator of the machine from the mixing tool. The safety shield may in the shielding position define a frusto-conical enclosure in which, when the machine motor runs, a rotating holder moves for the tool to process material, such a dough, contained in a bowl.

The improvement referred to relates to the provision of a removable element mounted to the aforementioned safety shield opening O for covering a portion of the plastic material structure, the removable element being of a flexible elastomeric material. Thereby a very user-friendly safety shield is provided, allowing for easy cleaning and for use with a greater variety of substances to be filled into the bowl, such as relatively hot substances, in that at least some of the fluid/substance contact surfaces may easily be cleaned by removing the removable element, such as by simply snapping off the element, which removable element fits in a washer better than the entire safety shield.

In an embodiment, the plastic material safety shield includes a funnel-shaped portion integral therewith and communicating with the opening, the removable element having a shape corresponding to that of the funnel shaped portion.

The removable covering element preferably may be turned inside out resulting from its elasticity, being of an elastomeric/stretchable material, to allow for easy cleaning of the surfaces thereof exposed to substances introduced into the bowl through the opening.

The invention claimed is:

1. A kneading or mixing machine comprising:
   a housing with opposite side walls;
   a motor in said housing for driving a kneading or mixing tool;
   a safety shield mounted to bearings for turning about an axis (A), wherein said safety shield is adapted to at least partly shield said kneading or mixing tool when said safety shield is turned to a shielding position, and wherein said safety shield comprising a pair of arms, wherein each of said pair of arms comprising a corresponding head at a free end thereof; and
   a central portion of each of said bearings receiving a corresponding one of said heads to allow for said turning, wherein said central portion of each of said bearings communicating with a corresponding entry slit configured for insertion of said corresponding head into said central portion of a corresponding one of said bearings in a direction transverse to said axis (A) along a path from an entry of said corresponding entry slit to an end wall of said central portion of said corresponding one of said bearings, wherein when said corresponding head is inserted into said central portion of said corresponding one of said bearings said path is unimpeded from said entry to said corresponding head;
   a magnet or a first magnetizable body mounted to said bearings and magnetically coupled with a second magnetizable body or magnet of said corresponding head;
   a safety switch located at one of said side walls and being operable between a passive state in which said motor is allowed to operate and an activated state in which said motor is prevented from operation, said safety switch being configured to switch from said passive state to said activated state when said safety shield is away from said shielding position; and
   a magnet for magnetic activation of said safety switch being mounted to one of said pair of arms distal from said free end, said safety switch mounted at a position coincident with said one of said pair of arms when said safety shield is in said shielding position.

2. The kneading or mixing machine according claim 1, wherein each of said bearings comprising a body with said corresponding central portion delimited by a portion of a cylindrical wall and with two opposite walls defining said corresponding entry slit, said corresponding head and/or said opposite walls preferably defined at least partially by a compressible material.

3. The kneading or mixing machine according to claim 1, said kneading or mixing machine comprising a front part with a front face comprising a control panel, wherein a mouth of said corresponding entry slit oriented away from said front face.

4. The kneading or mixing machine according to claim 1, wherein said safety switch comprises a displaceable activation element movable between a first position in which said safety switch is allowed to be in said passive state and a second position in which said safety switch is forced to said its activated state, wherein said displaceable activation element is biased towards said second position, and wherein said magnet is arranged to move said displaceable activation element from said second position to said first position when said safety shield is in said shielding position.

5. A kneading or mixing machine comprising:
a housing;
a motor in said housing for driving a kneading or mixing tool;
a safety shield mounted to said housing for turning about an axis (A) and being adapted to at least partly shield said kneading or mixing tool when said safety shield is turned to a shielding position, wherein said safety shield comprises a pair of arms;
a magnetically activatable safety switch operable between a first state in which said motor is allowed to operate and a second state in which said motor is prevented from operation, said safety switch being arranged to switch from said first state to said second state when said safety shield is away from said shielding position; and
a magnet mounted to one of said pair of arms for magnetic activation of said safety switch, wherein said magnet is mounted distally from a free end of said one of said pair of arms, and wherein said safety switch is arranged at a position coincident with said one of said pair of arms when said safety shield is in said shielding position;
wherein each of said pair of arms comprises a head at said free end thereof;
wherein the kneading or mixing machine further comprises bearings to which said safety shield is mounted, wherein a central portion of each of said bearings receiving a corresponding one of said heads to allow for said turning, and wherein said central portion of each of said bearings communicating with a corresponding entry slit configured for insertion of said corresponding one of said heads into said central portion in a direction transverse to said axis (A) along a path from an entry of said corresponding entry slit to an end wall of said central portion of said corresponding one of said bearings, wherein when said corresponding head is inserted into said central portion of said corresponding one of said bearings said path is unimpeded from said entry to said corresponding head; and
a magnet or a first magnetizable body mounted to said bearings and magnetically coupled with a second magnetizable body or magnet of said corresponding head.

6. A safety shield adapted to at least partly shield an operator of a mixing/kneading machine from a mixing/kneading tool when said safety shield is in a shielding position with said mixing/kneading tool working in a bowl, said safety shield comprising:
a molded plastic material structure including an opening (O) for introducing a substance into bowl during said mixing/kneading by said mixing/kneading tool;
a pair of arms attached to said molded plastic material structure, each of said pair of arms comprises a free end with a head that extends above said molded plastic material structure and said opening, wherein one of said pair of arms comprises:
a first magnetized body or a first magnet at said free end of said head of said one of said pair of arms; and
a second magnetized body or a second magnet that is distal from said free end of said head of said one of said pair of arms; and
a removable element mounted to a portion of said plastic material structure that defines at least partially said opening (O) for covering a portion of said plastic material structure, said removable element being of a flexible elastomeric material.

7. The safety shield according to claim 6, said removable element comprising a rim (R) configured for connection with said plastic material structure at said opening (O).

8. The safety shield according to claim 6, wherein said flexible elastomeric material being food compatible.

9. The safety shield according to claim 6, wherein said removable element having a funnel shape.

10. The safety shield according to claim 6, wherein said opening (O) being defined by a funnel-shaped portion of said plastic material structure, said removable element having a shape corresponding to said funnel shaped portion.

11. The safety shield according to claim 6, said removable element being configured for snap connection with a wall of said plastic material structure.

12. The safety shield according to claim 6, wherein a material of said removable element being compatible with substances introduced into said bowl at a temperature above 50° C.

13. The safety shield according to claim 6, said removable element defining an elongated filling mouth and, by comprising converging walls, an elongated discharge mouth, wherein said elongated filling mouth is wider than said elongated discharge mouth with said converging walls placed therebetween.

14. The safety shield according to claim 6, wherein said removable element may be turned inside out as a result of being of an elastomeric material.

\* \* \* \* \*